United States Patent
Tavildar et al.

(10) Patent No.: US 10,728,835 B2
(45) Date of Patent: Jul. 28, 2020

(54) INTER FREQUENCY LTE-D DISCOVERY

(71) Applicant: QUALCOMM Incorporated, San Diego, CA (US)

(72) Inventors: Saurabha Rangrao Tavildar, Jersey City, NJ (US); Sudhir Kumar Baghel, Bridgewater, NJ (US); Kapil Gulati, Franklin Park, NJ (US); Shailesh Patil, Raritan, NJ (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 15/074,370

(22) Filed: Mar. 18, 2016

(65) Prior Publication Data

US 2016/0295499 A1    Oct. 6, 2016

Related U.S. Application Data

(60) Provisional application No. 62/143,626, filed on Apr. 6, 2015.

(51) Int. Cl.
*H04W 48/12* (2009.01)
*H04L 5/00* (2006.01)
(Continued)

(52) U.S. Cl.
CPC ........... *H04W 48/12* (2013.01); *H04L 5/0007* (2013.01); *H04W 8/005* (2013.01); *H04W 48/16* (2013.01)

(58) Field of Classification Search
CPC ..... H04W 48/12; H04W 48/16; H04W 8/005; H04L 5/0007
See application file for complete search history.

(56) References Cited

U.S. PATENT DOCUMENTS 9,084,241 B2    7/2015 Madan et al.
2011/0268085 A1*    11/2011 Barany ............ H04W 36/0033
                                                     370/331
(Continued)

FOREIGN PATENT DOCUMENTS

JP    2010045552 A    2/2010
WO    2013172755 A1    11/2013
WO    2013177179 A1    11/2013

OTHER PUBLICATIONS

International Search Report and Written Opinion—PCT/US2016/023417—ISA/EPO—dated May 31, 2016.
(Continued)

*Primary Examiner* — Hashim S Bhatti
(74) *Attorney, Agent, or Firm* — Arent Fox LLP

(57) ABSTRACT

When a UE in a first cell operating at a first frequency attempts to discover another UE in a second cell operating at a second frequency, the UE in the first cell may need to constantly monitor communication on the second frequency to discover the UE in the second cell, which may not be desirable. According to an aspect of the disclosure, the apparatus receives, on a first frequency of a first channel from a first base station serving a first cell, discovery information associated with a second frequency of a second channel corresponding to a second cell, wherein the first frequency is a downlink (DL) frequency and the second frequency is an uplink (UL) frequency. The apparatus discovers, based on the received discovery information, one or more UEs on the second frequency of the second channel.

32 Claims, 9 Drawing Sheets

(51) Int. Cl.
*H04W 8/00* (2009.01)
*H04W 48/16* (2009.01)

(56) References Cited

U.S. PATENT DOCUMENTS

| | | | | |
|---|---|---|---|---|
| 2014/0370904 A1* | 12/2014 | Smith | ............ | H04W 8/005 455/450 |
| 2015/0043448 A1 | 2/2015 | Chatterjee et al. | | |
| 2015/0156619 A1* | 6/2015 | Fodor | ............ | H04W 8/005 455/434 |
| 2016/0183167 A1* | 6/2016 | Agiwal | ............ | H04W 48/16 370/329 |
| 2016/0192426 A1* | 6/2016 | Noh | ............ | H04W 76/14 370/329 |
| 2017/0078863 A1* | 3/2017 | Kim | ............ | H04W 48/16 |
| 2017/0230918 A1* | 8/2017 | Ryu | ............ | H04W 52/383 |

OTHER PUBLICATIONS

3GPP TS 36.213: "3rd Generation Partnership Project, Technical Specification Group Radio Access Network, Evolved Universal Terrestrial Radio Access (E-UTRA), Physical Layer Procedures (Release 12)", 3rd Generation Partnership Project (3GPP), Mobile Competence Centre, 650, Route Des Lucioles, F-06921 Sophia-Antipolis Cedex, France, vol. RAN WG1. No. V12.5.0, Mar. 25, 2015 (Mar. 25, 2015), pp. 1-239, XP050928106, [retrieved on Mar. 25, 2015] section 6.1.
Taiwan Search Report—TW105108700—TIPO—dated Jan. 8, 2020.
Ericsson: "D2D Broadcast Control Information and Related Procedures," 3GPP Draft; R1-142401 D2D Broadcast, 3rd Generation Partnership Project (3GPP), Mobile Competence Centre ; vol. RAN WG1, No. Seoul, Korea; May 1, 2014 May 23, 2014 May 18, 2014 (May 18, 2014), XP050789519, Retrieved from the Internet: URL:http://www.3gpp.org/ftp/Meetings_3GPP_SYNC/RAN1/RAN1/Docs/ [retrieved on May 18, 2014], 6 pages.
ETRI: "Consideration on Inter-PLMN Discovery," 3GPP Draft; R3-142398, 3rd Generation Partnership Project (3GPP), Mobile Competence Centre ; vol. RAN WG3, No. Shanghai, China; Oct. 6, 2014-Oct. 10, 2014 Oct. 5, 2014 (Oct. 5, 2014), XP050877671, Retrieved from the Internet: URL:http://www.3gpp.org/ftp/Meetings_3GPP_SYNC/RAN3/Docs/ [retrieved on Oct. 5, 2014], 3 pages.
Kyocera: "Intra-frequency and Inter-frequency Neighbor Cell Support," 3GPP Draft; R2-143755 Intra Inter Frequency D2D, 3rd Generation Partnership Project (3GPP), Mobile Competence Centre; RAN WG2, No. Dresden, Germany; Aug. 17, 2014-Aug. 22, 2014 Aug. 17, 2014 (Aug. 17, 2014), XP050794700, Retrieved from the Internet: URL:http://www.3gpp.org/ftp/Meetings_3GPP_SYNC/RAN2/Docs/ [retrieved on Aug. 17, 2014], 4 pages.
Qualcomm Incorporated: "Running Stage 2 CR TS 36.300 to Capture Agreement on eD2D," 3GPP Draft; R2 153890 CR36300 ED2D, 3rd Generation PartnershipProject (3GPP), Mobile Competence Centre; RAN WG2, No. Beijing, China; Aug. 24, 2015-Aug. 28, 2015 Sep. 14, 2015 (Sep. 14, 2015), XP051023320, Retrieved from the Internet: URL:http://www.3gpporg/ftp/tsg_ran/WG2_RL2/TSGR2_91/Docs/ [retrieved on Sep. 14, 2015], 16 pages.
Qualcomm Incorporated: "D2D Discovery Synchronization Window", 3GPP TSG-RAN WG4#73, R4-146980, 3GPP, Nov. 11, 2014, 3 pages
Qualcomm Incorporated: "D2D UE receiver behavior in various D2D scenarios", 3GPP TSG-RAN WG4#75 R4-153080, 3GPP, May 18, 2015, 10 pages.
Qualcomm Incorporated: "Signaling Details for ProSe Direct Discovery", 3GPP TSG-RAN WG2#87bis, R2-144548, 3GPP, Sep. 26, 2014, 9 pages.
Qualcomm Incorporated: "Inter-cell D2D Discovery", 3GPP TSG-RAN WG2 #85bis, R2-141671, 3GPP, Mar. 21, 2014, 2 pages.
Qualcomm Incorporated: "Open issues of ProSe Direct Discovery", 3GPP TSG-RAN WG2#88, R2-145189, 3GPP, Nov. 7, 2014, 4 pages.
Rapporteur (Qualcomm Incorporated): "[87bis#05] [LTE/ProSe] Running 36.300 CR—Email Discussion Report", 3GPP TSG-RAN WG2#88, R2-145237, 3GPP, Nov. 13, 2014, 3 pages.

* cited by examiner

INTER FREQUENCY LTE-D DISCOVERY

CROSS-REFERENCE TO RELATED APPLICATION(S)

This application claims the benefit of U.S. Provisional Application Ser. No. 62/143,626, entitled "INTER FREQUENCY LTE-D DISCOVERY" and filed on Apr. 6, 2015, which is expressly incorporated by reference herein in its entirety.

BACKGROUND

1. Field

The present disclosure relates generally to communication systems, and more particularly, to device discovery in Long Term Evolution (LTE) communication.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Improvements in device-to-device communication have constantly been made. In particular, efficient ways for a mobile device to discover other devices have been under development in various circumstances.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a user equipment (UE) in a first cell operating at a first frequency attempts to discover another UE in a second cell operating at a second frequency, the UE in the first cell may need to constantly monitor communication on the second frequency to detect the UE in the second cell. The constant monitoring of the communication on the second frequency may not be desirable, and thus more efficient approach to discover another UE in a different frequency has been under development.

According to an aspect of the disclosure, a first UE on a first frequency may receive, from the first base station, discovery information for a second frequency, in order to participate in discovery of the UEs on the second frequency. Based on the discovery information received from the first base station on the first frequency, the first UE may discover the UEs on the second frequency.

In an aspect of the disclosure, a method, a computer-readable medium, and an apparatus are provided. The apparatus may be a UE. The apparatus receives, on a first frequency of a first channel from a first base station serving a first cell, discovery information associated with a second frequency of a second channel corresponding to a second cell, where the first frequency is a downlink (DL) frequency and the second frequency is an uplink (UL) frequency. The apparatus discovers, based on the received discovery information, one or more UEs on the second frequency of the second channel.

In another aspect, the apparatus may be a UE. The apparatus includes means for receiving, on a first frequency of a first channel from a first base station serving a first cell, discovery information associated with a second frequency of a second channel corresponding to a second cell, where the first frequency is a DL frequency and the second frequency is a UL frequency. The apparatus includes means for discovering, based on the received discovery information, one or more UEs on the second frequency of the second channel.

In another aspect, the apparatus may be a UE including a memory and at least one processor coupled to the memory. The at least one processor is configured to: receive, on a first frequency of a first channel from a first base station serving a first cell, discovery information associated with a second frequency of a second channel corresponding to a second cell, where the first frequency is a DL frequency and the second frequency is a UL frequency, and discover, based on the received discovery information, one or more UEs on the second frequency of the second channel.

In another aspect, a computer-readable medium storing computer executable code for wireless communication includes code to: receive, on a first frequency of a first channel from a first base station serving a first cell, discovery information associated with a second frequency of a second channel corresponding to a second cell, where the first frequency is a DL frequency and the second frequency is a UL frequency, and discover, based on the received discovery information, one or more UEs on the second frequency of the second channel.

In another aspect of the disclosure, a method, a computer program product, and an apparatus are provided. The apparatus may be a UE. The apparatus receives a system information block (SIB) on a first frequency from a first base station, the SIB including information indicating whether one or more SIBs of a set of SIBs have changed for a second frequency of a second base station. The apparatus determines that at least one SIB of the one or more SIBs has changed for the second frequency of the second base station. The apparatus tunes to the second frequency to receive the at least one SIB. The apparatus discovers one or more UEs on the second frequency based on the received at least one SIB.

In another aspect, the apparatus may be a UE. The apparatus includes means for receiving a SIB on a first frequency from a first base station, the SIB including information indicating whether one or more SIBs of a set of SIBs have changed for a second frequency of a second base station. The apparatus includes means for determining that at least one SIB of the one or more SIBs has changed for the second frequency of the second base station. The apparatus includes means for tuning to the second frequency to receive the at least one SIB. The apparatus includes means for discovering one or more UEs on the second frequency based on the received at least one SIB.

In another aspect, the apparatus may be a UE including a memory and at least one processor coupled to the memory. The at least one processor is configured to: receive a SIB on a first frequency from a first base station, the SIB including information indicating whether one or more SIBs of a set of SIBs have changed for a second frequency of a second base station, determine that at least one SIB of the one or more SIBs has changed for the second frequency of the second base station, tune to the second frequency to receive the at least one SIB, and discover one or more UEs on the second frequency based on the received at least one SIB.

In another aspect, a computer-readable medium storing computer executable code for wireless communication includes code to: receive a SIB on a first frequency from a first base station, the SIB including information indicating whether one or more SIBs of a set of SIBs have changed for a second frequency of a second base station, determine that at least one SIB of the one or more SIBs has changed for the second frequency of the second base station, tune to the second frequency to receive the at least one SIB, and discover one or more UEs on the second frequency based on the received at least one SIB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
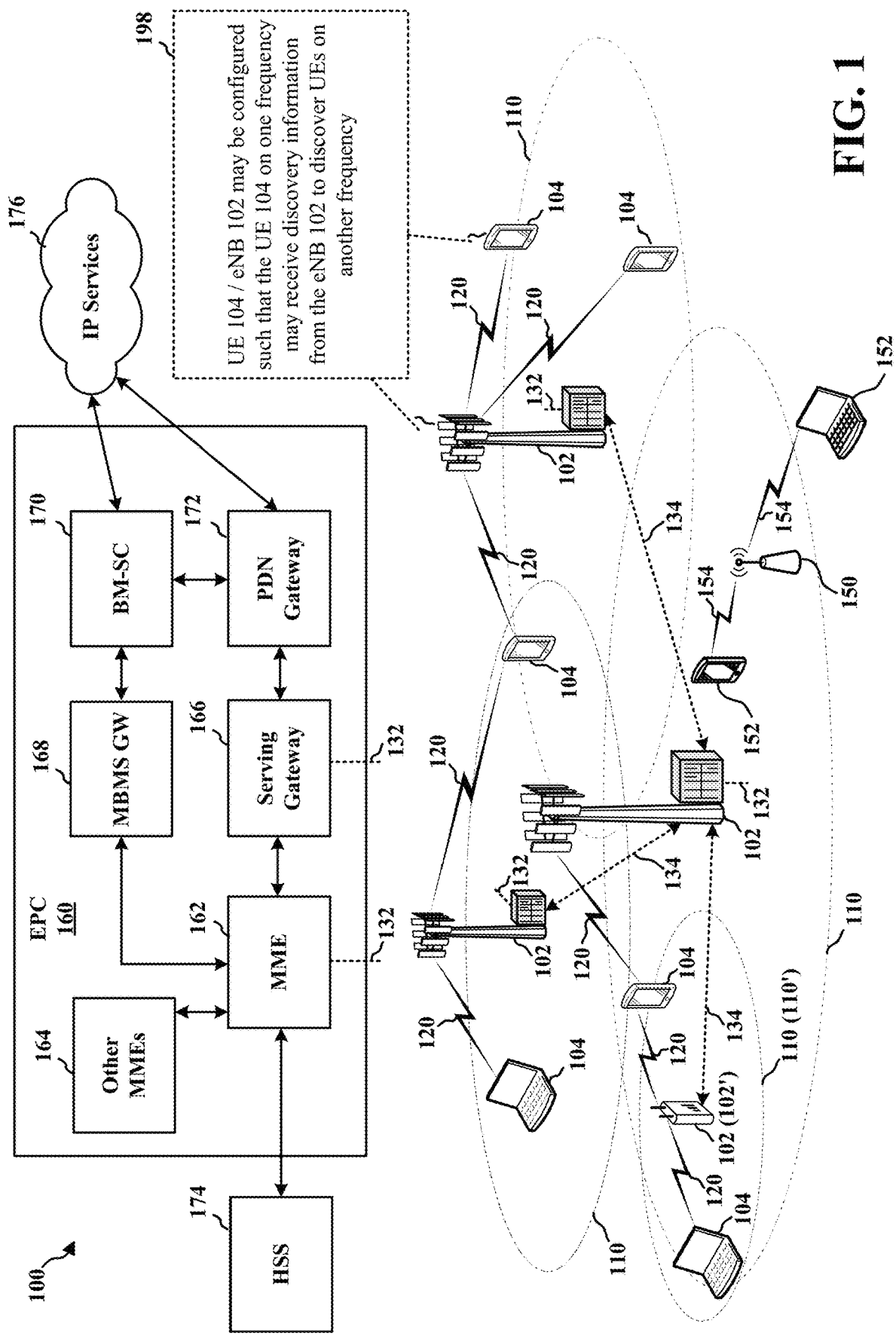
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured such that the UE 104 on one frequency may receive discovery information from the eNB 102 to discover UEs on another frequency (198).

Figure 2:
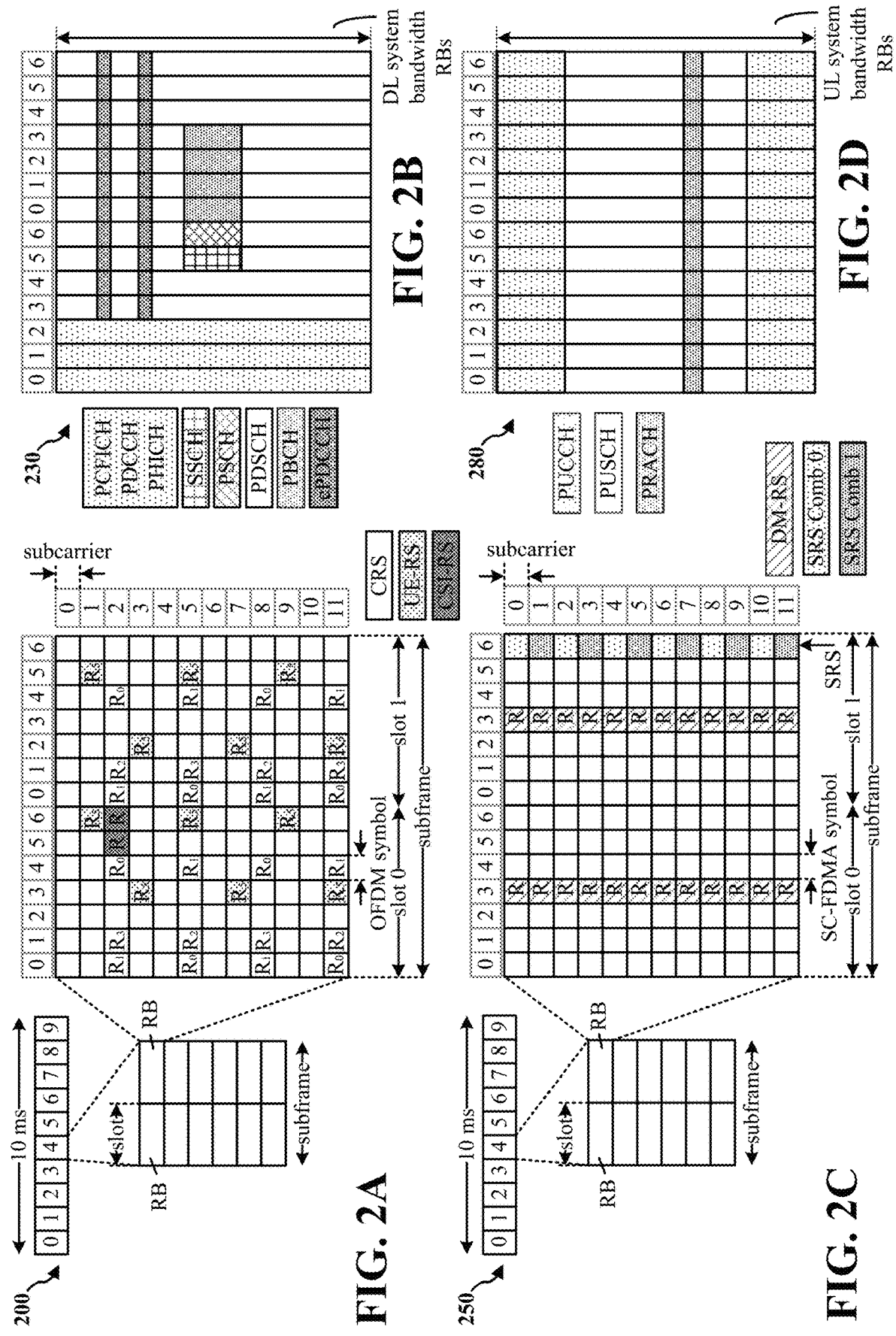
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
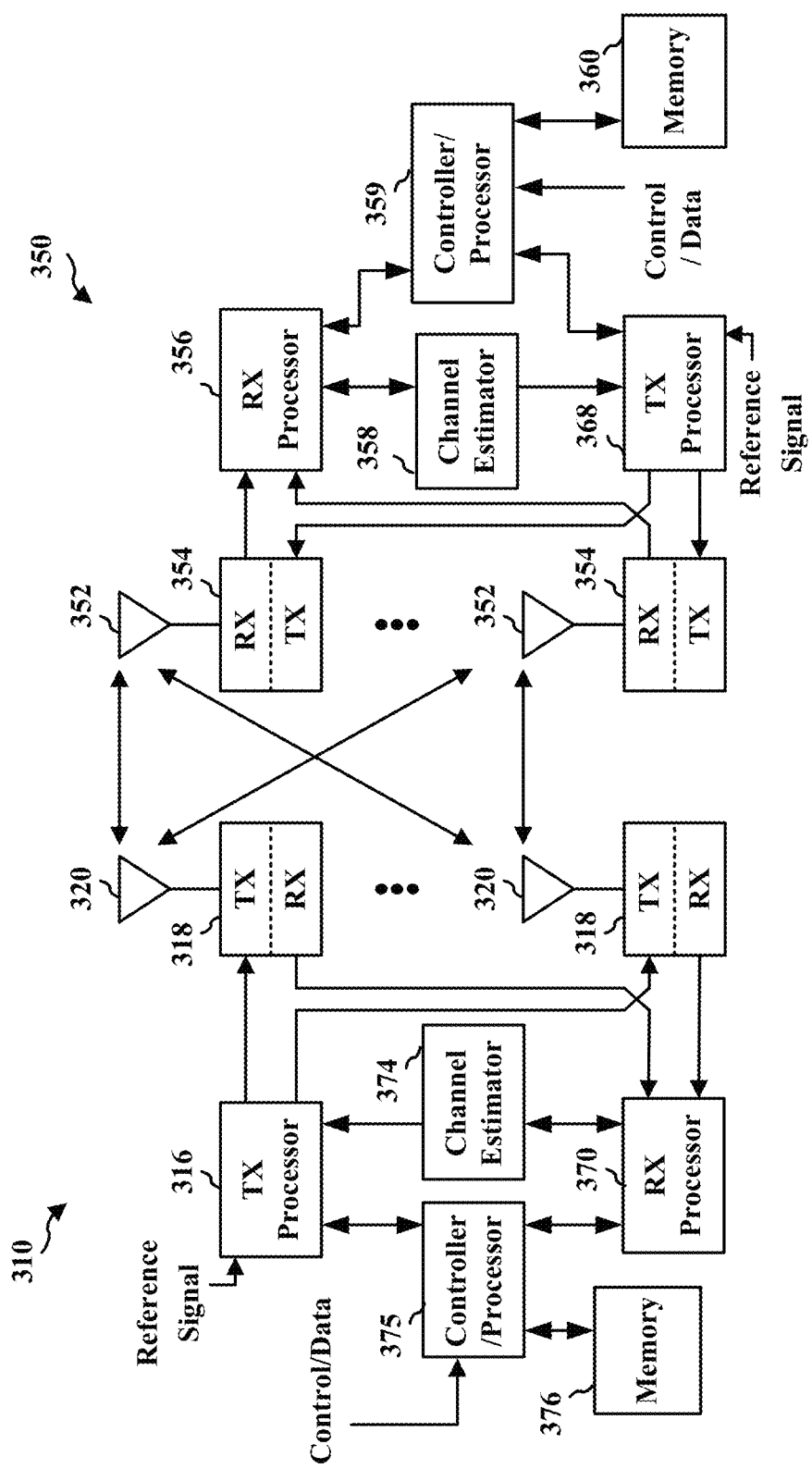
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
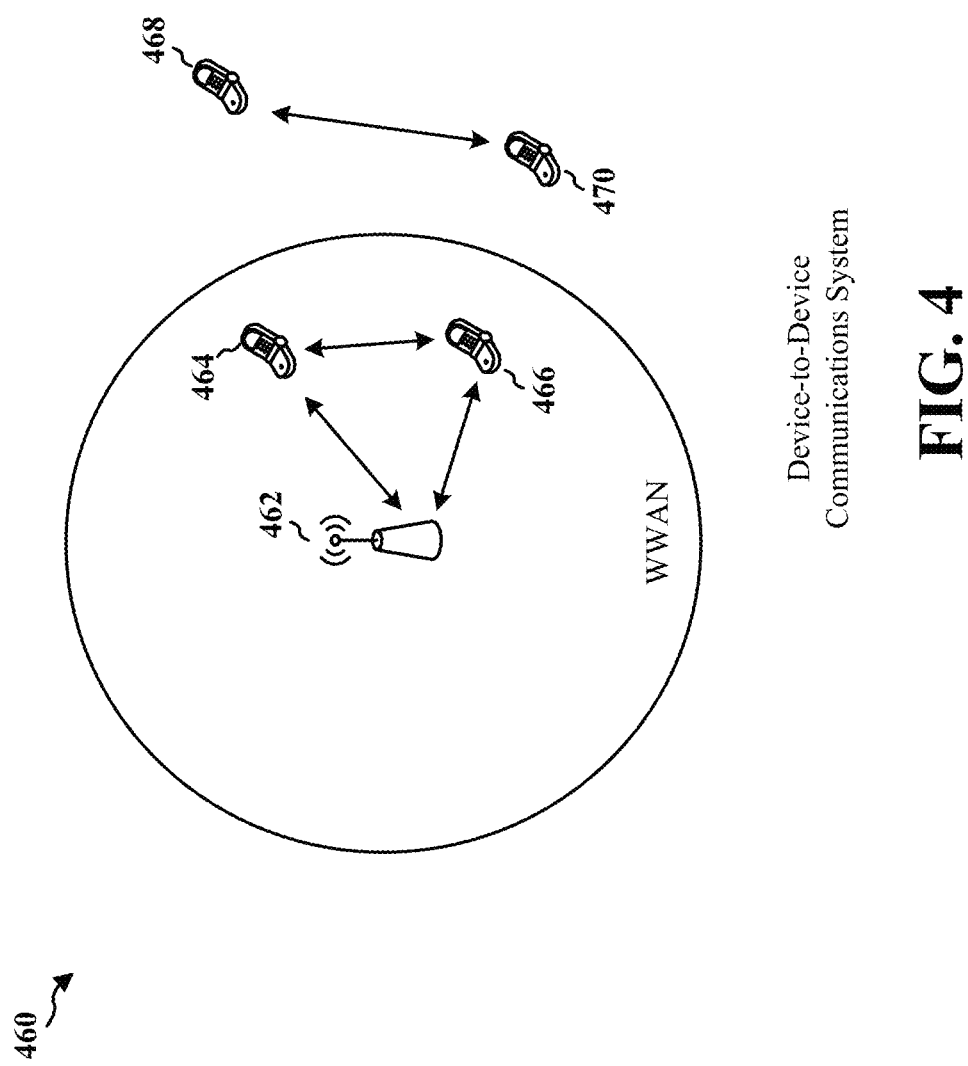
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

A wireless device (e.g., a UE) may discover other device in a same cell. For example, LTE Direct (LTE-D) has been developed for efficient device-to-device communication. A UE in a cell may attempt to discover other UEs in the same cell, where the cell operates at a certain carrier frequency. Cells operating at different respective frequencies may be deployed. For example, one or more base stations may serve a first cell on a first frequency (F1) and one or more other base stations may serve a second cell on a second frequency (F2) that is different from F1. A UE in the first cell may generally be able to discover other UEs in the first cell on F1, and a UE in the second cell may be able to discover other UEs in the second cell on F2. Further, an efficient approach for a UE in the first cell operating on F1 to discover other UEs in the second cell operating on F2 has been under development. In an aspect, an efficient approach for a UE in the first cell operating on F1 to participate in discovery of UEs in the second cell on F2 without constantly monitoring DL communication on F2 is desired.

Figure 5:
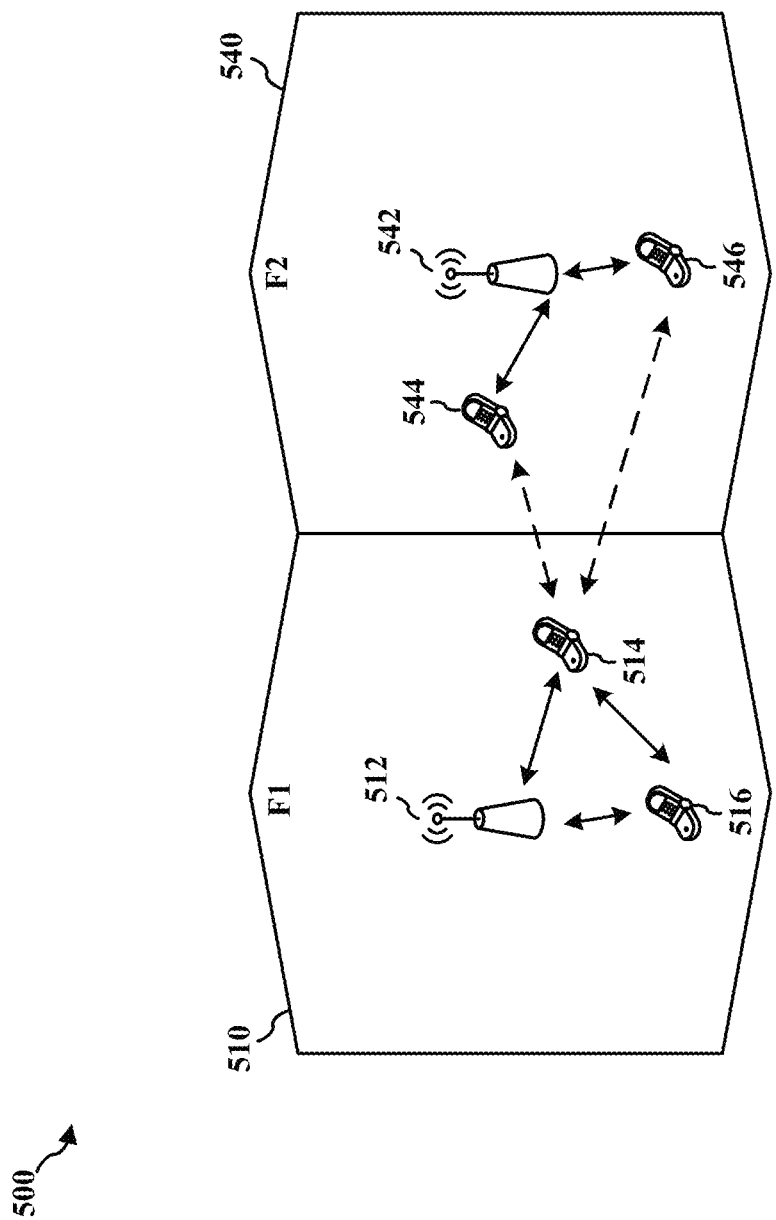
FIG. 5 is an example diagram illustrating a UE in a cell on one frequency participating in discovery of other UEs in another cell on another frequency.

FIG. 5 is an example diagram 500 illustrating a UE in a cell on one frequency participating in discovery of other UEs in another cell on another frequency. In the example diagram 500, a first cell 510 is served by a first base station 512 on a first frequency (F1) and a second cell 540 is served by a second base station 542 on a second frequency (F2). The second cell 540 is an inter-frequency neighbor cell of the first cell 510. It is noted that, in an aspect, the first cell 510 may be served by one or more base stations, and the second cell 540 may be served by one or more base stations. A first UE 514 and a second UE 516 may communicate with the first base station 512 on F1 (e.g. via a first channel corresponding to the first cell 510). A third UE 544 and a fourth UE 546 communicate with the second base station 542 on F2 (e.g. via a second channel corresponding to the second cell 540). The first UE 514 may participate in discovery of the second UE 516 on F1. The first UE 514 in the first cell 510 may also participate in discovery of the third UE 544 and/or the fourth UE 546 in the second cell 540, according to the following approaches of the disclosure.

According to a first approach of the disclosure, the first UE (e.g., the first UE 514) on F1 may receive discovery information for F2 in order to participate in discovery of the UEs (e.g., the third UE 544 and/or the fourth UE 546) on F2. The first UE on F1 receives the discovery information for F2 from the first base station (e.g., the first base station 512) serving the first cell on F1 (e.g., via a first channel corresponding to the first cell). F1 may be associated with the first channel corresponding to the first cell (e.g., the first cell 510 served by the first base station 512). F1 may be a DL frequency. F2 may be associated with a second channel corresponding to the second cell (e.g., the second cell 540 served by the second base station 542). F2 may be a UL frequency. Because the discovery information from the first base station is used to discover the UEs on F2, the first UE on F1 does not need to monitor DL channels on F2 to discover the UEs on F2. The first UE may receive the discovery information for F2 from the first base station on F1. The first base station may send, to the first UE, the discovery information for F2 via a DL channel using radio resource control (RRC) signaling such as a system information block (SIB) or RRC dedicated signaling. The first UE may also receive, from the first base station on F1, discovery information for F1 to participate in discovery of UEs on F1. The discovery information may include information to help the first UE on F1 discover UEs on another frequency, as follows. Based on the discovery information received from the first base station on F1, the first UE may discover the UEs (e.g., the third UE 544 and/or the fourth UE 546) on F2.

The discovery information may include discovery resource information. It is noted that the discovery resource information may include discovery resource information for discovery of UEs in the first cell (a current serving cell) and/or may include discovery resource information for discovery of UEs in a second cell that is an inter-frequency neighbor cell of the first cell. The first UE may receive discovery signals from other UEs, via discovery resources indicated in the discovery resource information. Thus, the first UE in the first cell may receive discovery signals from the UEs in the second cell via the discovery resources for discovery of the UEs in the second cell. The first UE in the first cell may also receive discovery signals from the other UEs in the first cell via the discovery resources for discovery of UEs in the first cell. The discovery resource information may include information on a pool of resources for each cell where the discovery is to be performed. If the pool of resources indicated in the discovery resource information is for the first cell (current serving cell), the first UE may transmit to and receive from the first cell via the pool of resources.

In an aspect, the discovery resource information may include a discovery subframe bitmap. The discovery subframe bitmap may include information on configuring a certain subframe used for discovery of other UEs. The discovery resource information may include a number of repetitions for the discovery subframe bitmap. For example, the number of repetitions for the discovery subframe bitmap may specify a number of repetitions for a certain subframe used for discovery of other UEs. The discovery resource information may include a discovery period during which discovery of other UEs may be performed by the first UE.

The discovery information may include radio parameters that may be used for discovery on F2. The radio parameters may include a maximum transmit power at which discovery signals are transmitted by the one or more UEs on F2. The radio parameters may include a network signaling (NS) value that is used to categorize frequency bands per requirements related to radio frequency (RF) communication. The radio parameters may include a nominal power ($P_o$) value and/or an alpha ($\alpha$) value, where $P_o$ and $\alpha$ are parameters for power control. For example, $P_o$ and $\alpha$ may be used to calculate transmit power of a UE.

The discovery resources may generally be signaled with respect to a timing reference, which may be a timing reference with respect to F2 by default. In this aspect of the disclosure, the discovery information may include timing reference information that indicates whether discovery resources are signaled with respect to a timing reference for F1. Thus, the first UE can use the timing reference for F1 to participate in the discovery of UEs on F2. In an aspect, the timing reference information may be included in a 1-bit portion in the discovery information. The timing reference information may be a specific system frame number (SFN) for F1, where the SFN for F1 may be SFN 0. The SFN for F1 may be used to synchronize with the second cell on F2.

The discovery information may include synchronization information that indicates whether synchronization signals for DL on F1 can be used to determine discovery resources for discovering UEs on F2. In an aspect, the synchronization information may further include offset information to indicate an offset (e.g., a subframe offset) with respect to DL on F1 and the discovery resources on F2. In particular, the first UE may utilize the sub-frame offset to perform synchronization for communication on F1 and communication on F2. In another aspect, the synchronization information may further indicate that the neighbor cell resources include an ambiguity window, where the ambiguity window may represent accuracy of the signaled neighbor cell resource. In an aspect, the synchronization information may be included in a 1-bit portion in the discovery information.

The discovery information may include reference signal information indicating whether reference signal received power (RSRP) on F1 is used for determining at least one of transmit power of the first UE or resource pool selection. It is noted that an RSRP value is a parameter that is used for computing the transmit power of the first UE. For example, the transmit power of the first UE may be computed by multiplying the RSRP value on F1 with a sum of the Po value and the alpha ($\alpha$) value. It is noted that at least one of the timing reference information, the synchronization information, or the reference signal information may be included in the 1-bit portion in the discovery information.

According to a second approach of the disclosure, the first UE may receive a system information block (SIB) on F1 from the first base station, where the SIB includes a value tag indicating whether there has been a change in one or more of SIBs for F2. If the first UE determines that there has been a change in one or more SIBs for F2 based on the received SIB, the first UE may receive one or more SIBs for F2. Based on the one or more SIBs for F2, the first UE may discover one or more UEs on F2. In an aspect, if the SIB received by the first UE is SIB1 on F1, the SIB1 of F1 may include a value tag indicating whether there has been a change in any of the SIBs for F2. In such an aspect, the value tag indicates a change if any one of the SIBs for F2 has changed. In such an aspect, if the value tag in the received SIB1 indicates the change, the first UE receives SIBs for F2. In another aspect, if the SIB received by the first UE is SIB19 on F1, the SIB19 of F1 may include a value tag indicating whether there has been a change in SIB19 of F2. If the value tag indicates that there has been a change in SIB19 of F2, the first UE reads the SIB19 of F2.

Figure 6:
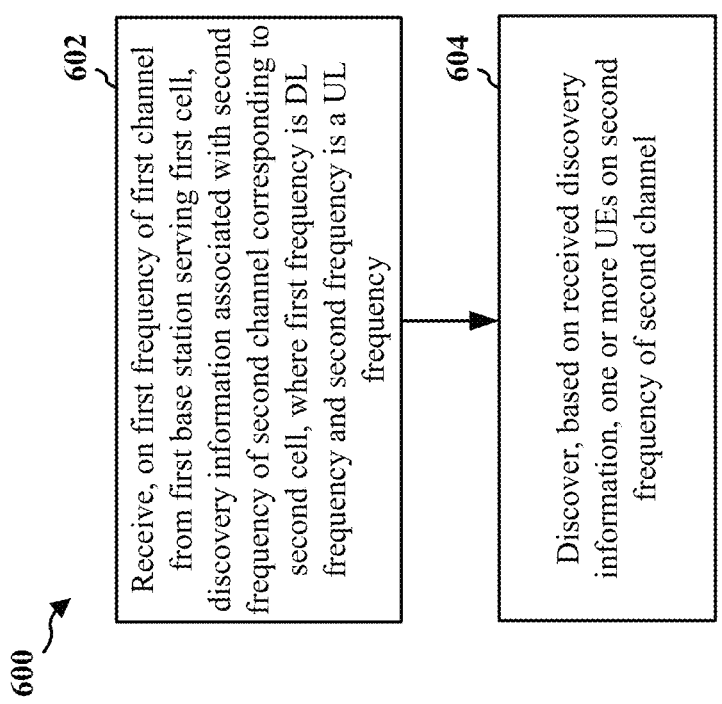
FIG. 6 is a flowchart of a method of wireless communication, according to an aspect of the disclosure.

FIG. 6 is a flowchart 600 of a method of wireless communication, according to an aspect of the disclosure. The method may be performed by a UE (e.g., the first UE 514, the apparatus 1102/1102'). At 602, the UE receives, on a first frequency of a first channel from a first base station serving a first cell, discovery information associated with a second frequency of a second channel corresponding to a second cell, where the first frequency is a DL frequency and the second frequency is a UL frequency. For example, as discussed supra, the first UE (e.g., the first UE 514) on F1 may receive discovery information for F2 in order to participate in discovery of the UEs (e.g., the third UE 544 and/or the fourth UE 546) on F2. For example, as discussed supra, the first UE on F1 receives the discovery information for F2 from the first base station (e.g., the first base station 512) serving the first cell on F1 (e.g., via a first channel corresponding to the first cell). At 604, the UE discovers, based on the received discovery information, one or more UEs on the second frequency of the second channel. Based on the discovery information received from the first base station on F1, the first UE may discover the UEs (e.g., the third UE 544 and/or the fourth UE 546) on F2.

In an aspect, the discovery information associated with the second frequency may be received through at least one of a SIB or dedicated RRC signaling. For example, as discussed supra, the first base station may send, to the first UE, the discovery information for F2 via a DL channel using radio resource control (RRC) signaling such as a system information block (SIB) or RRC dedicated signaling.

In an aspect, the discovery information associated with the second frequency includes discovery resource information on which discovery signals are received from one or more of the UEs on the second frequency. In such an aspect, the discovery resource information comprises at least one of a discovery subframe bitmap, a number of repetitions for the discovery subframe bitmap, or a discovery period. In an aspect, the received discovery information is further associated with the first frequency of the first base station, and includes discovery information associated with the second frequency and discovery information associated with the first frequency. For example, as discussed supra, the discovery information may include discovery resource information. For example, as discussed supra, the discovery resource information may include discovery resource information for discovery of UEs in the first cell (a current serving cell) and/or may include discovery resource information for discovery of UEs in a second cell that is an inter-frequency neighbor cell of the first cell. For example, as discussed supra, the discovery resource information may include a discovery subframe bitmap, may include a number of repetitions for the discovery subframe bitmap, and may include a discovery period during which discovery of other UEs may be performed by the first UE.

In an aspect, the discovery information associated with the second frequency includes one or more radio parameters for discovering the one or more UEs on the second frequency, where the one or more radio parameters include at least one of a maximum transmit power at which discovery signals are transmitted by the one or more UEs on the second frequency, an NS value, a nominal power (Po) value, or an alpha value for power control. For example, as discussed supra, the discovery information may include radio parameters that may be used for discovery on F2. For example, as discussed supra, the radio parameters may include a maximum transmit power at which discovery signals are transmitted by the one or more UEs on F2, may include an NS value that is used to categorize frequency bands per requirements related to RF communication, and may include a $P_o$ value and/or an alpha ($\alpha$) value, where $P_o$ and $\alpha$ are parameters for power control.

In an aspect, the discovery information associated with the second frequency includes timing reference information that indicates that discovery resources are with respect to a timing reference for the first frequency, and the UE discovers the one or more UEs on the second frequency in the discovery resources based on the timing reference information. For example, as discussed supra, the discovery information may include timing reference information that indicates that discovery resources are with respect to a timing reference for F1. For example, as discussed supra, the first UE can use the timing reference for F1 to participate in the discovery of UEs on F2. In such an aspect, the timing reference information is a specific SFN for the first frequency. For example, as discussed supra, the timing reference information may be a specific system frame number (SFN) for F1, where the SFN for F1 may be SFN 0.

In an aspect, the discovery information associated with the second frequency includes synchronization information indicating whether synchronization signals for downlink on the first frequency can be used to determine discovery resources on the second frequency. For example, as discussed supra, the discovery information may include synchronization information that indicates whether synchronization signals for DL on F1 can be used to determine discovery resources for discovering UEs on F2. In such an aspect, the synchronization information further includes offset information to indicate an offset with respect to the downlink on the first frequency and the discovery resources on the second frequency. For example, as discussed supra, the synchronization information may further include offset information to indicate an offset (e.g., a subframe offset) with respect to DL on F1 and the discovery resources on F2. In such an aspect, the synchronization information further includes ambiguity window information indicating that that neighbor cell resources include an ambiguity window. For example, as discussed supra, the synchronization information may further indicate that the neighbor cell resources include an ambiguity window, where the ambiguity window may represent accuracy of the signaled neighbor cell resource In an aspect, the received discovery information is further associated with the first frequency of the first base station, and includes information indicating whether RSRP on the first frequency is used for determining at least one of transmit power of the UE or resource pool selection. For example, as discussed supra, the discovery information may include reference signal information indicating whether RSRP on F1 is used for determining at least one of transmit power of the first UE or resource pool selection.

Figure 7:
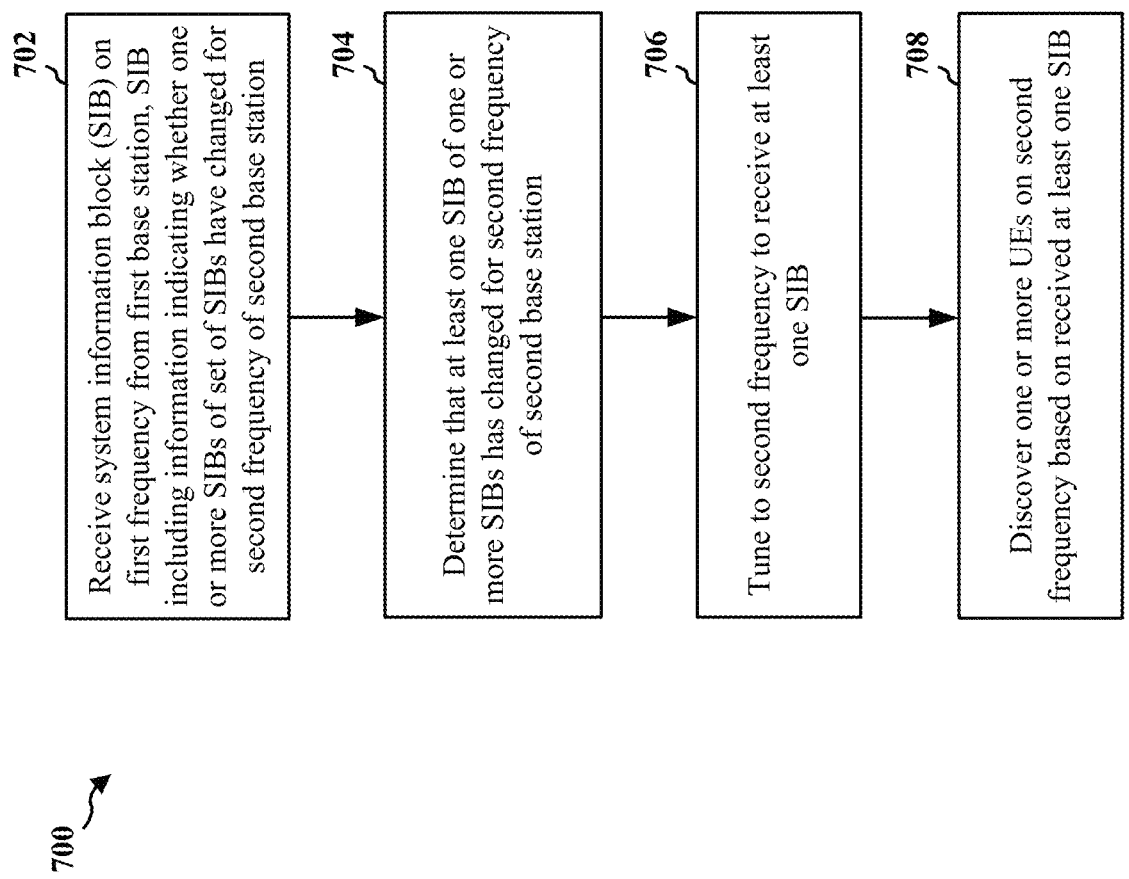
FIG. 7 is a flowchart of a method of wireless communication, according to an aspect of the disclosure.

FIG. 7 is a flowchart 700 of a method of wireless communication, according to an aspect of the disclosure. The method may be performed by a UE (e.g., the first UE 514, the apparatus 802/802'). At 702, the UE receives a SIB on a first frequency from a first base station, the SIB including information indicating whether one or more SIBs of a set of SIBs have changed for a second frequency of a second base station. For example, as discussed supra, the first UE may receive a system information block (SIB) on F1 from the first base station, where the SIB includes a value tag indicating whether there has been a change in one or more of SIBs for F2. At 704, the UE determines that at least one SIB of the one or more SIBs has changed for the second frequency of the second base station. At 706, the UE tunes to the second frequency to receive the at least one SIB. For example, as discussed supra, if the first UE determines that there has been a change in one or more SIBs for F2 based on the received SIB, the first UE may receive one or more SIBs for F2. At 708, the UE discovers one or more UEs on the second frequency based on the received at least one SIB. For example, as discussed supra, based on the one or more SIBs for F2, the first UE may discover one or more UEs on F2.

In an aspect, the SIB received on the first frequency is a SIB1. For example, as discussed supra, if the SIB received by the first UE is SIB1 on F1, the SIB1 of F1 may include a value tag indicating whether there has been a change in any of the SIBs for F2. In another aspect, the SIB received on the first frequency is a SIB19, the SIB19 indicates whether a SIB19 has changed for the second frequency of the second base station, and the received at least one SIB is the SIB19 for the second frequency. For example, as discussed supra, if the SIB received by the first UE is SIB19 on F1, the SIB19 of F1 may include a value tag indicating whether there has been a change in SIB19 of F2.

Figure 8:
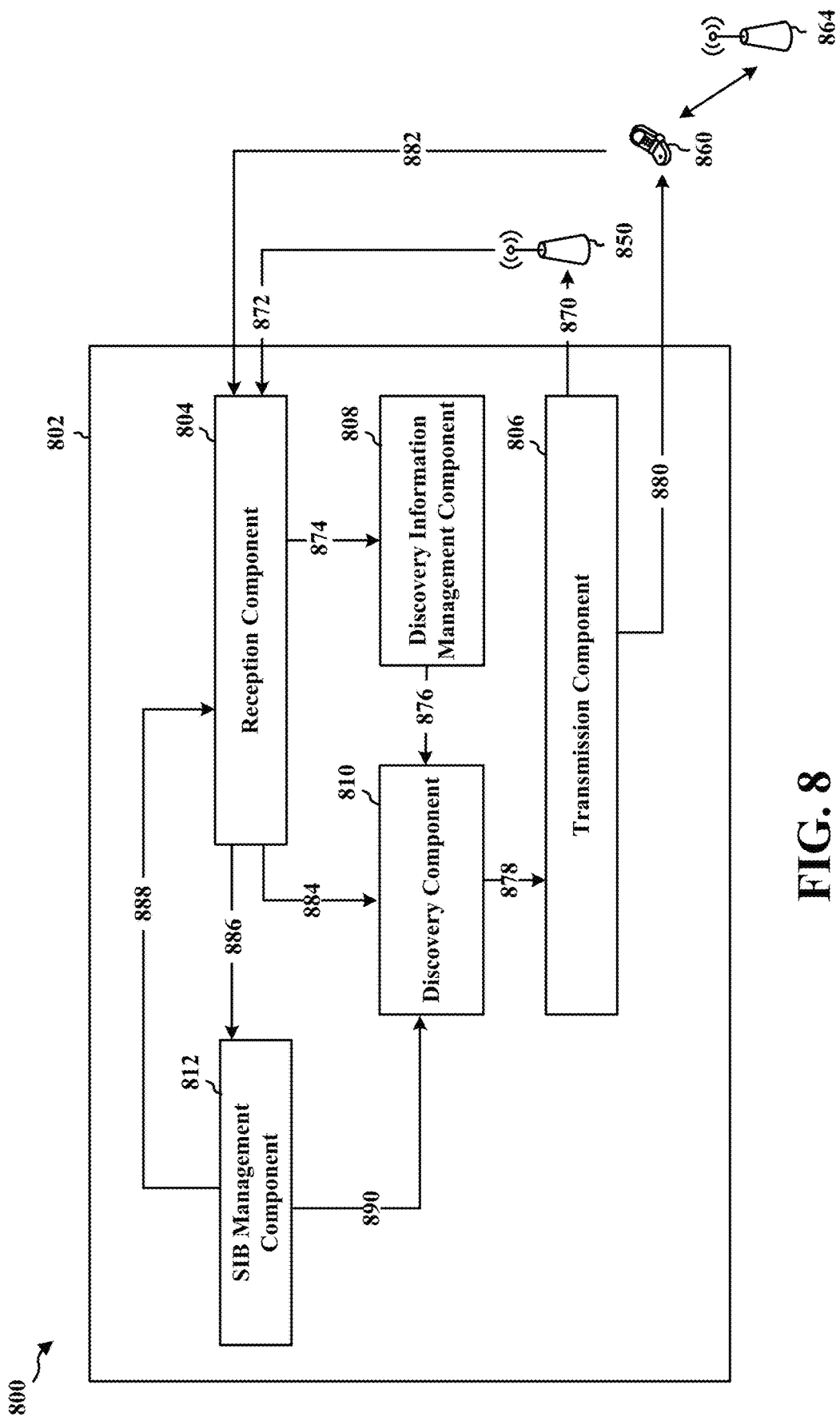
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE. The apparatus includes a reception component 804, a transmission component 806, a discovery information management component 808, a discovery component 810, and a SIB management component 812. The apparatus may communicate with the first base station 850 using the reception component 804 and the transmission component 806, at 870 and 872.

According to the first approach, the discovery information management component 808 receives via the reception component 804, on a first frequency of a first channel from a first base station 850 serving a first cell, discovery information associated with a second frequency of a second channel corresponding to a second cell, at 872 and 874, where the first frequency is a DL frequency and the second frequency is a UL frequency. The discovery information management component 808 may forward the discovery information to the discovery component 810, at 876. The discovery component 810 discovers, based on the received discovery information, one or more UEs (e.g., UE 860) on the second frequency of the second channel (e.g., in a second cell served by a second base station 864), via the transmission component 806 and the reception component 804, at 878, 880, 882, and 884. In an aspect, the discovery information associated with the second frequency is received through at least one of a SIB or dedicated RRC signaling.

In an aspect, the discovery information associated with the second frequency includes discovery resource information on which discovery signals are received from one or more of the UEs on the second frequency. In such an aspect, the discovery resource information comprises at least one of a discovery subframe bitmap, a number of repetitions for the discovery subframe bitmap, or a discovery period. In an aspect, the received discovery information is further associated with the first frequency of the first base station 850, and includes discovery information associated with the second frequency and discovery information associated with the first frequency.

In an aspect, the discovery information associated with the second frequency includes one or more radio parameters for discovering the one or more UEs on the second frequency, where the one or more radio parameters include at least one of a maximum transmit power at which discovery signals are transmitted by the one or more UEs on the second frequency, an NS value, a nominal power (Po) value, or an alpha value for power control.

In an aspect, the discovery information associated with the second frequency includes timing reference information that indicates that discovery resources are with respect to a timing reference for the first frequency, and the discovery component 810 discovers the one or more UEs (e.g., UE 860) on the second frequency in the discovery resources based on the timing reference information, at 878, 880, 882, and 884. In such an aspect, the timing reference information is a specific SFN for the first frequency.

In an aspect, the discovery information associated with the second frequency includes synchronization information indicating whether synchronization signals for downlink on the first frequency can be used to determine discovery resources on the second frequency. In such an aspect, the synchronization information further includes offset information to indicate an offset with respect to the downlink on the first frequency and the discovery resources on the second frequency. In such an aspect, the synchronization information further includes ambiguity window information indicating that that neighbor cell resources include an ambiguity window.

In an aspect, the received discovery information is further associated with the first frequency of the first base station 850, and includes information indicating whether RSRP on the first frequency is used for determining at least one of transmit power of the UE or resource pool selection.

According to the second approach, the SIB management component 812 receives, at 872 and 886, via the reception component 804 a SIB on a first frequency from a first base station 850, the SIB including information indicating whether one or more SIBs of a set of SIBs have changed for a second frequency of a second base station (e.g., the second base station 864). The SIB management component 812 determines that at least one SIB of the one or more SIBs have changed for the second frequency of the second base station. The SIB management component 812 tunes to the second frequency, at 888, to receive the at least one SIB. The discovery component 810 discovers one or more UEs (e.g., the UE 860) on the second frequency based on the received at least one SIB, via the transmission component 806 and the reception component 804, at 890, 878, 880, 882, and 884.

In an aspect, the SIB received on the first frequency is a SIB1. In another aspect, the SIB received on the first frequency is a SIB19, the SIB19 indicates whether a SIB19 has changed for the second frequency of the second base station, and the received at least one SIB is the SIB19 for the second frequency.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
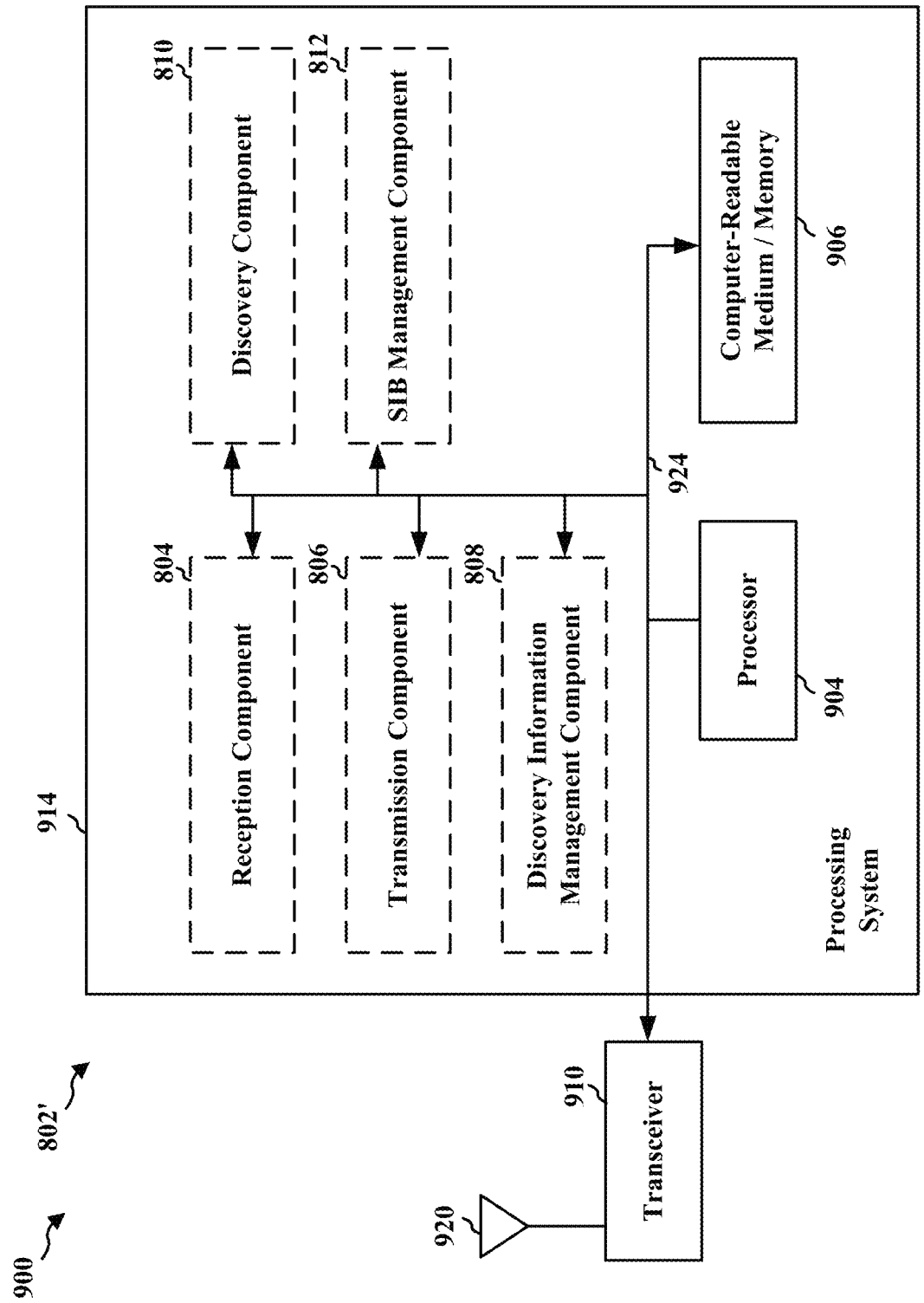
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for receiving, on a first frequency of a first channel from a first base station serving a first cell, discovery information associated with a second frequency of a second channel corresponding to a second cell, where the first frequency is a DL frequency and the second frequency is a UL frequency, and means for discovering, based on the received discovery information, one or more UEs on the second frequency of the second channel.

In another configuration, the apparatus 802/802' for wireless communication includes means for receiving a SIB on a first frequency from a first base station, the SIB including information indicating whether one or more SIBs of a set of SIBs have changed for a second frequency of a second base station, means for determining that at least one SIB of the one or more SIBs have changed for the second frequency of the second base station, means for tuning to the second frequency to receive the at least one SIB, and means for discovering one or more UEs on the second frequency based on the received at least one SIB.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
    receiving, on a first frequency of a first channel from a first base station serving a first cell, discovery information associated with a second frequency of a second channel corresponding to a second cell, wherein the first frequency is a downlink (DL) frequency and the second frequency is an uplink (UL) frequency, wherein the discovery information is further associated with the first frequency of the first base station, wherein the discovery information associated with the first frequency comprises reference signal information indicating whether reference signal received power (RSRP) on the first frequency is used for determining resource pool selection, wherein the discovery information associated with the second frequency is received through a system information block (SIB), wherein the SIB includes information indicating whether one or more SIBs have changed for the second frequency;
    determining, based on a value tag of the received SIB, that at least one SIB of the one or more SIBs has changed for the second frequency for a second base station, wherein if the at least one SIB received on the first frequency is a SIB1, the SIB1 includes the value tag indicating whether the at least one SIB has changed for the second frequency, wherein if the at least one SIB received on the first frequency is a SIB19, the SIB19 includes the value tag indicating whether the at least one SIB has changed for the second frequency;
    tuning to the second frequency to receive the at least one SIB; and
    discovering, based on the received at least one SIB, one or more UEs on the second frequency.

2. The method of claim 1, wherein the discovery information associated with the second frequency further comprises discovery resource information on which discovery signals are received from the one or more of the UEs on the second frequency.

3. The method of claim 2, wherein the discovery resource information further comprises at least one of a discovery subframe bitmap, a number of repetitions for the discovery subframe bitmap, or a discovery period.

4. The method of claim 1, wherein receiving the discovery information further comprises receiving discovery information associated with the second frequency and discovery information associated with the first frequency.

5. The method of claim 1, wherein the discovery information associated with the second frequency further comprises one or more radio parameters for discovering the one or more UEs on the second frequency, wherein the one or more radio parameters include at least one of a maximum transmit power at which discovery signals are transmitted by the one or more UEs on the second frequency, a network signaling (NS) value, a nominal power (Po) value, or an alpha value for power control.

6. The method of claim 1, wherein the discovery information associated with the second frequency further comprises timing reference information that indicates that discovery resources are with respect to a timing reference for the first frequency, and
    wherein the UE discovers the one or more UEs on the second frequency in the discovery resources based on the timing reference information.

7. The method of claim 1, wherein the discovery information associated with the second frequency further comprises synchronization information indicating whether synchronization signals for downlink on the first frequency can be used to determine discovery resources on the second frequency.

8. The method of claim 7, wherein the synchronization information further includes ambiguity window information indicating that that neighbor cell resources include an ambiguity window.

9. A user equipment (UE) for wireless communication, comprising:
    means for receiving, on a first frequency of a first channel from a first base station serving a first cell, discovery information associated with a second frequency of a second channel corresponding to a second cell, wherein the first frequency is a downlink (DL) frequency and the second frequency is an uplink (UL) frequency, wherein the discovery information is further associated with the first frequency of the first base station, wherein the discovery information associated with the first frequency comprises reference signal information indicating whether reference signal received power (RSRP) on the first frequency is used for determining resource pool selection, wherein the discovery information associated with the second frequency is received through a system information block (SIB), wherein the SIB includes information indicating whether one or more SIBs have changed for the second frequency;
    means for determining, based on a value tag of the received SIB, that at least one SIB of the one or more SIBs has changed for the second frequency for a second base station, wherein if the at least one SIB received on the first frequency is a SIB1, the SIB1 includes the value tag indicating whether the at least one SIB has changed for the second frequency, wherein if the at least one SIB received on the first frequency is a SIB19, the SIB19 includes the value tag indicating whether the at least one SIB has changed for the second frequency;
    means for tuning to the second frequency to receive the at least one SIB; and
    means for discovering, based on the received at least one SIB, one or more UEs on the second frequency.

10. The UE of claim 9, wherein the discovery information associated with the second frequency further comprises discovery resource information on which discovery signals are received from the one or more of the UEs on the second frequency.

11. The UE of claim 10, wherein the discovery resource information further comprises at least one of a discovery subframe bitmap, a number of repetitions for the discovery subframe bitmap, or a discovery period.

12. The UE of claim 9, wherein receiving the discovery information further comprises receiving discovery information associated with the second frequency and discovery information associated with the first frequency.

13. The UE of claim 9, wherein the discovery information associated with the second frequency further comprises one or more radio parameters for discovering the one or more UEs on the second frequency, wherein the one or more radio parameters include at least one of a maximum transmit power at which discovery signals are transmitted by the one or more UEs on the second frequency, a network signaling (NS) value, a nominal power (Po) value, or an alpha value for power control.

14. The UE of claim 9, wherein the discovery information associated with the second frequency further comprises timing reference information that indicates that discovery resources are with respect to a timing reference for the first frequency, and
wherein the means for discovering the one or more UEs on the second frequency is configured to discover the one or more UEs on the second frequency in the discovery resources based on the timing reference information.

15. The UE of claim 9, wherein the discovery information associated with the second frequency further comprises synchronization information indicating whether synchronization signals for downlink on the first frequency can be used to determine discovery resources on the second frequency.

16. The UE of claim 15, wherein the synchronization information further includes ambiguity window information indicating that that neighbor cell resources include an ambiguity window.

17. A user equipment (UE) for wireless communication, comprising:
a memory; and
at least one processor coupled to the memory and configured to:
receive, on a first frequency of a first channel from a first base station serving a first cell, discovery information associated with a second frequency of a second channel corresponding to a second cell, wherein the first frequency is a downlink (DL) frequency and the second frequency is an uplink (UL) frequency, wherein the discovery information is further associated with the first frequency of the first base station, wherein the discovery information associated with the first frequency comprises reference signal information indicating whether reference signal received power (RSRP) on the first frequency is used for determining resource pool selection, wherein the discovery information associated with the second frequency is received through a system information block (SIB), wherein the SIB includes information indicating whether one or more SIBs have changed for the second frequency;
determine, based on a value tag of the received SIB, that at least one SIB of the one or more SIBs has changed for the second frequency for a second base station, wherein if the at least one SIB received on the first frequency is a SIB1, the SIB1 includes the value tag indicating whether the at least one SIB has changed for the second frequency, wherein if the at least one SIB received on the first frequency is a SIB19, the SIB19 includes the value tag indicating whether the at least one SIB has changed for the second frequency; and
tuning to the second frequency to receive the at least one SIB; and
discover, based on the received at least one SIB, one or more UEs on the second frequency.

18. The UE of claim 17, wherein the discovery information associated with the second frequency further comprises discovery resource information on which discovery signals are received from the one or more of the UEs on the second frequency.

19. The UE of claim 18, wherein the discovery resource information further comprises at least one of a discovery subframe bitmap, a number of repetitions for the discovery subframe bitmap, or a discovery period.

20. The UE of claim 17, wherein the discovery information further comprises discovery information associated with the second frequency and discovery information associated with the first frequency.

21. The UE of claim 17, wherein the discovery information associated with the second frequency further comprises one or more radio parameters for discovering the one or more UEs on the second frequency, wherein the one or more radio parameters include at least one of a maximum transmit power at which discovery signals are transmitted by the one or more UEs on the second frequency, a network signaling (NS) value, a nominal power (Po) value, or an alpha value for power control.

22. The UE of claim 17, wherein the discovery information associated with the second frequency further comprises timing reference information that indicates that discovery resources are with respect to a timing reference for the first frequency, and
wherein the at least one processor configured to discover the one or more UEs on the second frequency is configured to discover the one or more neighboring UEs in the discovery resources based on the timing reference information.

23. The UE of claim 17, wherein the discovery information associated with the second frequency further comprises synchronization information indicating whether synchronization signals for downlink on the first frequency can be used to determine discovery resources on the second frequency.

24. The UE of claim 23, wherein the synchronization information further includes ambiguity window information indicating that that neighbor cell resources include an ambiguity window.

25. A non-transitory computer-readable medium storing computer executable code for wireless communication, comprising code to:
receive, on a first frequency of a first channel from a first base station serving a first cell, discovery information associated with a second frequency of a second channel corresponding to a second cell, wherein the first frequency is a downlink (DL) frequency and the second frequency is an uplink (UL) frequency, wherein the discovery information is further associated with the first frequency of the first base station, wherein the discovery information associated with the first frequency comprises reference signal information indicating whether reference signal received power (RSRP) on the first frequency is used for determining resource pool selection, wherein the discovery information associated with the second frequency is received through a system information block (SIB), wherein the SIB includes information indicating whether one or more SIBs have changed for the second frequency;
determine, based on a value tag of the received SIB, that at least one SIB of the one or more SIBs has changed for the second frequency for a second base station, wherein if the at least one SIB received on the first frequency is a SIB1, the SIB1 includes the value tag indicating whether the at least one SIB has changed for the second frequency, wherein if the at least one SIB received on the first frequency is a SIB19, the SIB19 includes the value tag indicating whether the at least one SIB has changed for the second frequency;

tune to the second frequency to receive the at least one SIB; and discover, based on the received at least one SIB, one or more UEs on the second frequency.

26. The non-transitory computer-readable medium of claim 25, wherein the discovery information associated with the second frequency further comprises discovery resource information on which discovery signals are received from the one or more of the UEs on the second frequency.

27. The non-transitory computer-readable medium of claim 26, wherein the discovery resource information further comprises at least one of a discovery subframe bitmap, a number of repetitions for the discovery subframe bitmap, or a discovery period.

28. The non-transitory computer-readable medium of claim 25, wherein the discovery information further comprises discovery information associated with the second frequency and discovery information associated with the first frequency.

29. The non-transitory computer-readable medium of claim 25, wherein the discovery information associated with the second frequency further comprises one or more radio parameters for discovering the one or more UEs on the second frequency, wherein the one or more radio parameters include at least one of a maximum transmit power at which discovery signals are transmitted by the one or more UEs on the second frequency, a network signaling (NS) value, a nominal power (Po) value, or an alpha value for power control.

30. The non-transitory computer-readable medium of claim 25, wherein the discovery information associated with the second frequency further comprises timing reference information that indicates that discovery resources are with respect to a timing reference for the first frequency, and wherein the computer-readable medium comprising code to discover the one or more UEs on the second frequency comprises code to discover the one or more neighboring UEs in the discovery resources based on the timing reference information.

31. The non-transitory computer-readable medium of claim 25, wherein the discovery information associated with the second frequency further comprises synchronization information indicating whether synchronization signals for downlink on the first frequency can be used to determine discovery resources on the second frequency.

32. The non-transitory computer-readable medium of claim 31, wherein the synchronization information further includes ambiguity window information indicating that that neighbor cell resources include an ambiguity window.

* * * * *